United States Patent [19]

Clarke

[11] Patent Number: 4,457,032
[45] Date of Patent: Jul. 3, 1984

[54] SEAT CUSHION

[76] Inventor: Edwin B. Clarke, 41 Conshohocken St. Rd., Bala Cynwyd, Pa. 19004

[21] Appl. No.: 266,090

[22] Filed: May 21, 1981

[51] Int. Cl.³ .................. A47C 27/15; B60N 1/02
[52] U.S. Cl. .................................. 5/481; 5/432; 297/230
[58] Field of Search .................. 5/481, 448, 437, 432, 5/433; 297/229, 230, 231, 380, 382

[56] References Cited

U.S. PATENT DOCUMENTS

| | | | |
|---|---|---|---|
| 2,483,077 | 9/1949 | Walsh | 297/380 |
| 2,577,949 | 12/1951 | Barrett | 297/231 |
| 3,242,507 | 3/1966 | Peterson | 5/411 |
| 4,164,798 | 8/1979 | Weber | 297/456 |

Primary Examiner—Alexander Grosz
Attorney, Agent, or Firm—Eugene E. Renz, Jr.

[57] ABSTRACT

An improved, portable auxiliary seat cushion is described having a seat panel and a back rest panel hingedly connected to form a unitary structure, the under side of the seat panel and the rearward side of the back panel being composed of a flexible resilient synthetic plastic foam having a high coefficient of friction, and including means such as stitching extending across the hinged connection and anchored in the seat panel and back panel to or other means to provide tension biasing the back panel upwardly and rearwardly away from the seat panel so as to prevent the back panel from falling forward onto the seat panel, the biasing means, which may be elastic, also cooperating with the high coefficient of friction of the plastic foam to resist displacement of said seat cushion relative to any underlying supporting structure such as the seat of an automobile.

14 Claims, 6 Drawing Figures

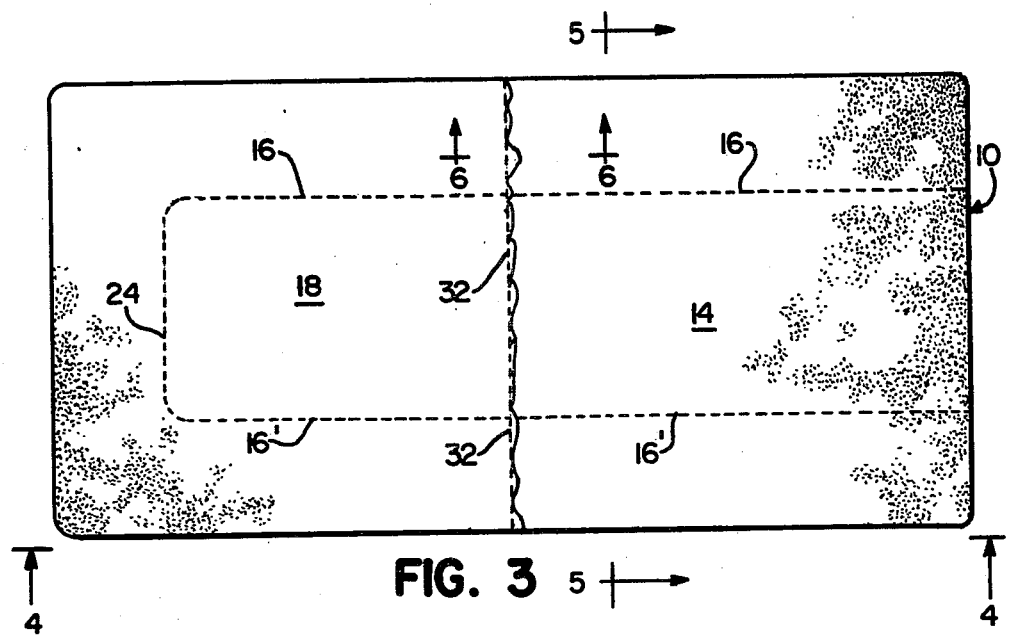
FIG. 3
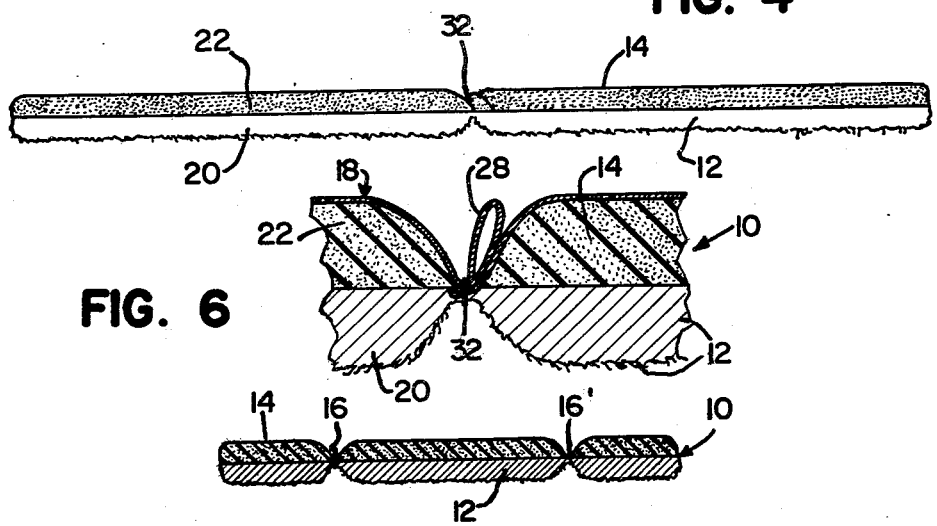
FIG. 4
FIG. 6
FIG. 5

SEAT CUSHION

The present invention relates to an improved portable auxiliary seat cushion of the type used in automobiles, boats, or other vehicles, or in chairs or other seating in the home or elsewhere.

More particularly, the present invention relates to a portable auxiliary seat cushion which will not slip when placed on a supporting structure such as an automobile or boat seat or a chair or any other surface which remains in operable position with the back upright even when not in use.

THE PRIOR ART

Portable auxiliary seat cushions for use in automobiles and boats, for example, have been available for many years. Such cushions have been made of a wide variety of materials and are variously designed to improve the comfort of an existing seat, which may be worn or uncomfortable, or to increase the height of the seat to afford improved vision in an automobile, for example, or to provide aeration between the seat and the user. A disadvantage of such auxiliary seat cushions previously available has been that they tend to slip and collapse and not to remain in place, particularly when the user is getting in or out of the automobile or both. Therefore, the position of the auxiliary seat must be adjusted with annoying frequency.

Typical of such seat cushions is that shown and described in Weber U.S. Pat. No. 4,164,798 issued Aug. 21, 1979, in which a seat pad and a back rest composed of a urethane foam are enclosed in a casing and suitably hingedly united. The cover is made of a suitable textile material having relatively high frictional characteristics. The seat pad and back rest are freely movable relative to each other around the hinged connection without restraint and, therefore, the back rest can easily flop down on top of the seat cushion when not in use.

Hebrank U.S. Pat. No. 2,734,556, issued Feb. 14, 1959 shows a seat cushion similar to that of the Weber patent in that the seat and back rest, composed of porous foam rubber, are enclosed in a cover composed of plastic fiber material, the seat cushion and back rest are detachably secured by suitable fastener elements. Here again, there is no means to prevent the back rest from falling forward onto the seat cushion when not in use, thus requiring the user to set the back rest up and hold it in place while sitting down on the seat cushion, a most difficult maneuver to accomplish.

Champion U.S. Pat. No. 3,346,298, issued Oct. 10, 1967, shows a seat cushion having two wedge-shaped foam blocks serving respectively as a seat and back rest, arranged with the thinner positions of the wedges at the hinged connection. Here again, there is no provision to keep the back rest in an upright position.

It is apparent from the foregoing, that previously available auxiliary seat cushions have been clumsy affairs which did not tend to remain in operable position when not in use, to thus facilitate sitting on them without first having to prop the back rest up while attempting to occupy the cushion.

It is an object of the present invention, therefore, to provide an improved portable auxiliary seat cushion which tends to remain in the position in which it is placed even when the user is getting in or out of the seat cushion in an automobile or boat or any other chair or seating device.

It is another object of the invention to provide such an improved seat cushion which has a non-slip plastic foam seat panel and back rest panel which enable the cushion to remain in position without slipping under the weight of the user no matter what type of surface underlies the seat cushion.

It is still another object of the invention to provide an improved seat cushion having a seat panel and a back rest panel which remains in the normal upright position even when not in use.

It is yet another object of the invention to provide an improved, portable, auxiliary seat cushion wherein the under surfaces of both the seat panel and the back rest panel have a high coefficient of friction which cooperates with means for maintaining the back rest panel in upright position so as to resist displacement of the seat cushion relative to any underlying supporting structure such as an automobile seat.

BRIEF SUMMARY OF THE INVENTION

The foregoing and other objects of the present invention, which will become apparent below, are achieved by providing a portable auxiliary seat cushion comprising a seat panel and a back rest panel hingedly connected thereto. The seat panel optionally comprises an upper layer composed of a fibrous material providing a seating surface, and necessarily, a lower layer composed of a material having a high coefficient of friction, the upper and lower layers being united into a unitary structure whereby a non-slip seat cushion is provided which when placed on any supporting structure under a load will not slip relative to said supporting structure.

The upper layer of the seat cushion may be composed of the same material as the lower layer or any other suitable material providing comfort for the user. It is preferred that the upper layer of material be of substantial thickness, for example, $\frac{1}{4}$ or $\frac{1}{2}$", or more, and is suitably provided by a fluffy resilient fibrous material. Especially preferred materials include natural lamb's wool or sheared sheepskin. However, in the present invention, the fluff fibrous material may be natural or synthetic, such as an artificial sheepskin composed of polyester fibers. It is also preferred that the material composing the seating surface should be anti-static, i.e. it should not accummulate a static charge, either positive or negative, which would have a tendency to cling to the garments of the user. Such an anti-static surface may be achieved by any means known to the art such as by chemical anti-static agents.

The lower layer of the seat panel is composed of a material having a relatively high coefficient of friction which prevents the seat panel from sliding with respect to any surface with which it is in contact. This material should be flexible and, preferably, resilient. An especially suitable material is a flexible, resilient, polyurethane foam. Here again, the lower layer may be of substantial thickness in order to provide comfort to the user.

The upper and lower layers of the seating panel are united to form a unitary structure by any suitable means. This means may be adhesive, stitching, tufting, stapling or other mechanical fastening means, or it may be provided by a chemical or adhesive bond between the fibrous or other upper layer and the foamed plastic or other lower layer.

The seat panel is hingedly connected to a back rest panel having the same or similar construction.

The hinged connection between the seat panel and the back rest panel may be of any suitable type, known to the art, such as stitching tape, snap fasteners or the like. Suitable means are provided to prevent the back rest panel from falling forward onto the seat panel, thus aiding in keeping the back rest panel upright against any supporting back rest, such as the back of the seat of the automobile, boat or chair. Conversely, the hinge means preferrably permits the seat panel and back rest panel to be folded together in the opposite direction, i.e. the under layer of one against the under layer of the other, to facilitate storage, packing and shipping of the two panel seat cushion in a minimum of space.

Inasmuch as the novel seat cushions may be used on a wide variety of different supporting structures, such as leather, vinyl or fabric automobile seats, wood, plastic or metal boat seats, leather, vinyl, fabric or other chair seats, or indeed on plastic or ceramic surfaces, the ground, grass, or even pine needles, or any other surface, it is necessary that the lower layer of the seat panel and the back or rear layer of the back rest panel, must have a relatively high coefficient of friction, such that the seat cushion will have a tendency to stay where placed and will not slide relative to the supporting structure regardless of the material of which it is composed. While any suitable material may be used for this purpose, flexible, resilient, polyurethane foam has been found to be especially suitable, since it will not slide relative to virtually any known material used in seating devices, especially when a load is placed on the upper surface or seating surface or back rest of the seat cushion, such as the weight of a person, or a package, or whatever.

It should be apparent from the foregoing, that the new improved portable auxiliary seat cushion provides a cushion which can be placed on an automobile seat, a boat seat, a chair or any other seating surface, where the back rest panel will remain in upright in use position, and the seat cushion will remain in place without slipping or sliding, particularly when weighted or loaded, as by the weight of a person sitting on the cushion. It should also be apparent that, inasmuch as the new seat cushion does not slide with respect to the supporting surface, it is possible for a person to get in or out of the seat cushion in an automobile, a boat or vehicle, without materially dislodging the seat cushion from its position in the vehicle. This desirable result is achieved without permanently fastening the seat cushion to the supporting structure as by adhesive or other means and thus, the seat cushion remains permanently portable and removable and yet has a tendency to remain where placed, and thus avoids the previous annoyance of having to constantly replace the cushion each time a person enters or leaves the vehicle or chair.

BRIEF DESCRIPTION OF THE DRAWINGS

The invention will now be described in greater detail in conjunction with the accompanying drawings wherein:

FIG. 3 is a bottom plan view of the seat cushion showing the underside of the seat panel and back rest panel and the hinged connection therebetween;

FIG. 4 is a sectional view taken along the line 4—4 of FIG. 3;

FIG. 5 is a sectional view taken along the line 5—5 of FIG. 3; and

FIG. 6 is a sectional view taken along the line 6—6 of FIG. 3.

DETAILED DESCRIPTION OF THE INVENTION

Figure 1:
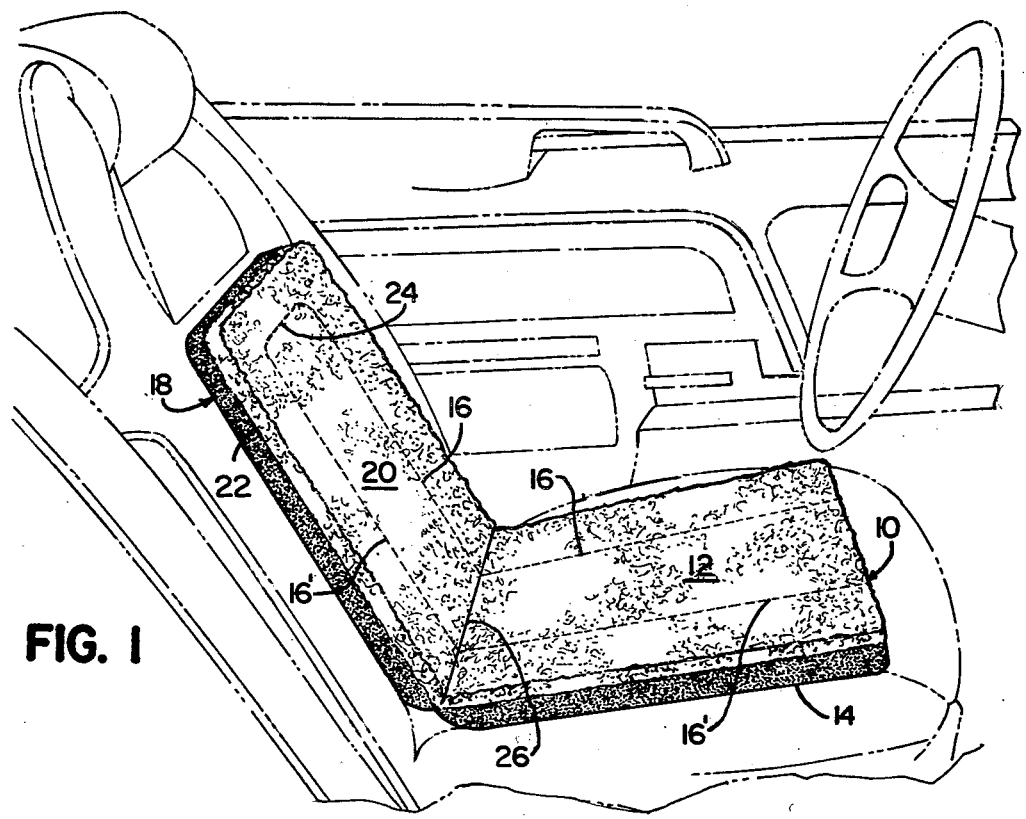
FIG. 1 is a perspective view of a seat cushion of the invention in place in the driver's seat of an automobile.

The improved portable auxiliary seat cushions of the present invention, as illustrated in the preferred embodiment shown in FIG. 1, comprise a seat panel 10, comprising an upper layer 12 optionally composed of a fibrous material such as sheared sheepskin or a man-made equivalent, providing a comfortable seating surface. The seat panel 10 also comprises a lower layer 14 (as seen in FIG. 3) preferably composed of a flexible resilient material having a high coefficient of friction, such as, for example, any suitable synthetic plastic foam, such as a flexible, resilient polyurethane foam in slab or sheet form. The upper layer 12 and lower layer 14 of the seat panel 10 are united into a unitary structure by any suitable means, such as by means of adhesive or by a chemical bond between the fibrous material and the plastic foam, by stitching 16, 16'. A back rest panel 18 is also provided having a construction similar to the seat panel with an upper, forward layer 20, and a lower rearward layer back rest 22. The lines of stitchery 16 and 16' extend into the panel as shown and are connected by lateral stitching 24.

Figure 2:
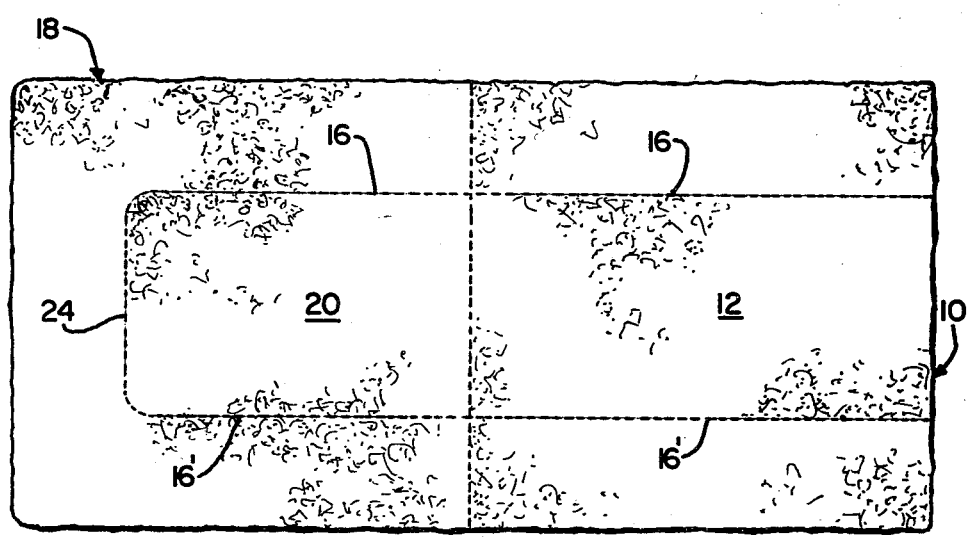
FIG. 2 is a top plan view of the seat cushion of FIG. 1, showing the seating panel, the back rest panel and the hinged connection therebetween.

Any suitable connection may be employed between the seating panel 10 and the back rest panel 18 which provides a flexible hinge 26 therebetween. However, the flexible hinge 26 has limited flexibility in one direction, so that the upper surface 12 of the seat panel 10 and the forward facing surface 20 of the back rest panel 18 will not remain folded together. On the other hand, it is preferred that the hinge 26 permit the lower surface 14 of the seat panel 10 and the rearward surface 22 of the back panel 18 to be folded together so as to lie in parallel planes in order to facilitate storage, packing and shipping of the seat cushion. In this way, the stitching 16, 16' running across the hinge 26 as best shown in FIGS. 2 and 3, prevents the back rest panel from falling forward when the seat cushion is not in use. This ensures that the back rest panel remains in its upright position, even when the seat is empty.

The hinge 26 may be provided by any suitable means such as stitching, or stitching with a welt of a further polyurethane foam sheet 28 of the rearward layer 22 of the back rest panel and lower layer 14 of the seat panel, or it may be provided by a tape between the two panels and fastened in any suitable manner, or by straps connecting the two panels and either permanently attached to the panels or attached by separable means such as snap fasteners, or any other suitable means.

The peripheral edges of the upper and lower layers of the seat panel and back rest panel may be united by any suitable means such as adhesive or chemical bonding or by stitching. In a preferred embodiment the fabric of the upper layers is welted with the sheet 28 of polyurethane and united by blind stitching, adhesive or heat fusion.

In the preferred embodiment shown in the drawings, the lines of stitching 16 and 16' extend across the hinge between the seat panel and back rest panel and are anchored in those panels on either side of the hinge. The stitching on the lower side of the seat panel 12 and on the lower or rearward side of the back rest panel may be tensioned by making it too short to permit the two panels to come together with the forward surface of the back panel in contact with the upper surface of the seat panel unless substantial external pressure is applied. In this way, the stitching on the underside of the seat panel and rearward side of the back rest panel, normally biases the seat panel and back rest panel apart in one direction so that the back rest panel can not fall forward to lie on the upper surface of the seat panel. Therefore, when the seat cushion is resting on a supporting structure, such as an automobile seat, the back rest panel is biased upwardly and rearwardly against the back rest support structure.

The stitching on the upper surface of the seat panel and forward surface of the back rest panel, in this embodiment, is relaxed and, it does not pull the back rest panel forwardly or downwardly toward the upper surface of the seat panel.

The stitching in lines 16 and 16' as noted above is under tension in this embodiment on the under side of the seat cushion for the stated purpose. This may be accomplished with any suitable thread or other stitching material by various means such as installing the stitching in one panel and then bending the two panels together face to face while carrying the stitching across the hinge and into the other panel. In this way, the stitching is too short and acts to bias the two panels apart as described above. The required tension may be enhanced by the use of elastic thread or other stitching material. While this is one preferred embodiment of the means for preventing the back rest panel from falling forward onto said seat panel, thereby maintaining the back rest panel in an upright position, it will be apparent to those skilled in the art, that in any other suitable tensioning or biasing means may be employed to ensure that the back rest panel remains in the upright position relative to the seat panel whether the seat cushion is in use or not. For example, the rows of stitching 16, 16' could be replaced by stiff wires or metal, wooden or plastic straps joined at the hinge by spring loaded biasing means. Alternatively, the biasing means could take the form of spring steel straps crimped at the hinge to provide the required tension and bias between the two panels.

The biasing or tensioning means for maintaining the back rest panel in an upright position when the seat cushion is supported on suitable seating, cooperates with the high coefficient of friction on the under side of the seat panel and the rearward side of the back rest panel to increase the friction between the seat cushion and any structure on which it is supported, since the biasing action applies pressure against such supporting surfaces. In this way, the biasing action and high coefficient of friction together operates to resist relative displacement of the seat cushion with respect to any surface on which it rests. This, of course, aids in preventing dislodgement of the seat cushion from its intended, positions of use thus avoiding the annoyance of having to position it prior to use.

It should also be noted that while the lines of stitching 16, 16' in the upper surface of the back rest layer are connected by a similar line of stitching 24, the lines 16 and 16' in the upper portion of the seat panel extend to the forward edge of the seat without interruption, providing comfortable depressions in the fluffy sheep skin material for the legs of the occupant of the seat cushion.

Another especially preferred embodiment of the invention is shown in FIG. 6 which employs an alternative biasing means. In this embodiment, the lower layer 14 of the seat panel 10 and lower rearward layer of the back rest panel 18 are preferably covered with a single sheet of a resilient material such as a sheet of resilient foam 28. Sheet 28 is connected to the upper surface of the seat panel and the forward surface of the back rest panel along the periphery of the seat cushion by any suitable means such as stitching. Foam sheet 28 covers making up the lower layers 14 and 22 of the seat panel and back rest panel and is tensioned by pulling the sheet 28 from lower layer 14 and rearward layer 22 toward the central hinge 26. The material gathered in this way is then welted as best shown in FIG. 6 and held by the stitching 32 of the hinge. Welted, as used herein, includes pulling and securing the sheet 28 at a point or along a line on the sheet cushion. Sheet 28 can also be pulled toward the periphery of the seat cushion and connected along the periphery to the upper and forward surfaces. In this way the resilience of the elastic sheet 28 is utilized to tension the lower layer 14 of the seat panel and rearward layer 22 of the back rest panel so as to bear the upper forward layer of the back rest panel away from the upper layer of the seat panel. Therefore, the tension thus produced in the sheet 28 biases the back rest panel to maintain it in upright operable position in the same way as the stitching 16 and 16' in the embodiment of FIGS. 1 and 2.

Of course any other suitable material other than elastic polyurethane foam could be used in sheet 28 to provide the biasing means. Moreover, the lower layer of the seat panel and lower or rearward layer of the back rest panel, instead of being covered by a unitary sheet 28, each can be covered by separate sheets of suitable material, stretched or tensioned toward the hinge and fastened at the hinge by suitable means such as stitching, staples or the like. It will be apparent from the foregoing that not only the specific means described or listed above such as welted material, but many others known to the art or yet to be developed, could be used to provide the means for maintaining the back rest panel in the upright position.

What is claimed is:

1. In a portable auxiliary seat cushion having a seat panel and a back rest panel hingedly connected by a hinge connection to form a unitary structure and wherein the under side of said seat panel and the rearward side of said back rest panel have a high coefficient of friction to prevent relative slippage between said seat cushion and any supporting surfaces on which it is placed; the improvement which comprises, in combination;

said under side of said seat panel and said rearward side of said back panel being composed of a flexible, resilient synthetic plastic foam having a high coefficient of friction; and stitch means for preventing said back panel from falling forward onto said seat panel, said stitch means extending across said hinge connection and being anchored in said seat panel and back rest panel, thereby maintaining said back panel in a generally upright position when said seat cushion is placed on a structure providing support for said seat panel and back rest panel.

2. The seat cushion of claim 1 wherein said stitch means operates to prevent said back rest panel from falling forward onto said seat panel but does not prevent folding the underside of said seat panel against the rearward side of said back rest panel to form a compact folded seat cushion for storage in the minimum volume of space.

3. The seat cushion of claim 1 wherein the stitch means comprises at least two laterally spaced lines of stitching extending across the hinged connection and a substantial distance into said seat panel and back rest panel on each side of said hinged connection.

4. The seat cushion of claims 1, 2 or 3 wherein said stitching is made with an elastic material.

5. A portable, auxiliary seat cushion having a seat panel and a back rest panel hingedly connected by a hinge connection to form a unitary structure, the under side of said seat panel and rearward side of said back rest panel have a high coefficient of friction to prevent relative slippage between said seat cushion and any supporting surfaces on which it is placed, comprising:
said seat panel and said back panel including a layer of a flexible, resilient foam material; and
stitch means compressing said layer of foam material along said hinge connection of said panels thereby biasing said panels relative to one another such that said back panel resists forward pivoting toward said seat panel when said seat cushion is placed on a seat structure having a seat portion and back rest portion disposed generally transversely in an upright position.

6. A seat cushion of claim 5, further comprising a first sheet overlying one side of said foam layer and forming the top surface of said seat panel and back rest panel and a second sheet underlying the opposite face of said foam layer forming the underside of said seat panel and rearward side of said back rest panel, said stitch means connecting said first and second sheets to said foam layer along said hinge connection.

7. A seat cushion as claimed in claim 6, wherein said first sheet comprises a fibrous material.

8. A seat cushion as claimed in claim 6, wherein said second sheet comprises a flexible resilient material.

9. A seat cushion as claimed in claim 6, wherein said stitch means also connects said first and second sheets along the periphery of said seat cushion providing additional biasing to maintain said seat cushion in said generally upright position.

10. A seat cushion as claimed in claim 5, further comprising sheet material completely encapsulating said foam layer and connected thereto by said stitch means at least along said hinge connection.

11. In a portable, auxiliary seat cushion having a seat panel and a back rest panel hingedly connected by a hinge connection to form a unitary structure, the under side of said seat panel and the rearward side of said back rest panel have a high coefficient of friction to prevent relative slippage between said seat cushion and any supporting surfaces on which it is placed comprising:
said seat panel and said back rest panel including a layer of a flexible, resilient foam material;
a flexible resilient sheet surrounding said layer of said seat panel and said back rest panel forming the underside of said seat panel and rearward side of said back rest panel; and
stitch means holding gathered portions of said sheet thereby providing tension between said underside of said seat panel and rearward side of said back rest panel along said hinged connection, such that said back panel is maintained in a generally upright position when said seat cushion is placed on a seat structure having a seat portion and back rest portion disposed generally transversely in an upright position.

12. The seat cushion of claim 11, wherein said stitch means holds said gathered portions in the form of a welt.

13. The seat cushion of claim 12, wherein said welt is held by said stitch means along said hinged connection.

14. A portable, auxiliary seat cushion having a seat panel and a back rest panel hingedly connected by a hinged connection to form a unitary structure, comprising:
said seat panel and said back panel including a layer of a flexible, resilient foam material; and
stitch means compressing said layer of foam material along said hinge connection of said panels thereby biasing said panels relative to one another such that said back panel resists forward pivoting toward said seat panel when said seat cushion is placed on a seat structure having a seat portion and back rest portion disposed generally transversely in an upright position.

* * * * *